United States Patent [19]

Ogasawara et al.

[11] Patent Number: 6,070,052

[45] Date of Patent: *May 30, 2000

[54] DECISION-THEORETIC SATELLITE COMMUNICATIONS SYSTEMS

[75] Inventors: Gary H. Ogasawara, Foster City; Timothy Ju, Palo Alto, both of Calif.

[73] Assignee: Lockheed Martin Missiles and Space, Sunnyvale, Calif.

[*] Notice: This patent is subject to a terminal disclaimer.

[21] Appl. No.: 09/358,415

[22] Filed: Jul. 22, 1999

Related U.S. Application Data

[63] Continuation of application No. 08/953,424, Oct. 17, 1997.

[51] Int. Cl.[7] .................................................. H04B 7/185
[52] U.S. Cl. ........................ 455/13.1; 455/427; 455/450
[58] Field of Search .................................. 455/427, 428, 455/12.1, 13.1

[56] References Cited

U.S. PATENT DOCUMENTS

| | | |
|---|---|---|
| H1507 | 12/1995 | Hendrickson et al. . |
| 3,644,678 | 2/1972 | Schmidt . |
| 3,683,116 | 8/1972 | Dill . |
| 4,330,857 | 5/1982 | Alvarez, III et al. . |
| 4,356,484 | 10/1982 | Eckhardt . |
| 4,398,289 | 8/1983 | Schoute . |
| 4,574,378 | 3/1986 | Kobayashi . |
| 4,747,101 | 5/1988 | Akaiwa et al. . |
| 4,763,325 | 8/1988 | Wolfe et al. . |
| 4,870,642 | 9/1989 | Nehara et al. . |
| 4,999,833 | 3/1991 | Lee . |
| 5,197,125 | 3/1993 | Engel et al. . |
| 5,268,694 | 12/1993 | Jan et al. . |
| 5,295,138 | 3/1994 | Greenburg et al. . |
| 5,307,509 | 4/1994 | Michalon et al. . |
| 5,327,432 | 7/1994 | Abedeen et al. . |
| 5,363,374 | 11/1994 | Abedeen et al. . |
| 5,377,222 | 12/1994 | Sanderford, Jr. . |
| 5,392,450 | 2/1995 | Nossen . |
| 5,402,478 | 3/1995 | Hluchyj et al. ........................ 379/221 |
| 5,412,753 | 5/1995 | Alston et al. . |
| 5,430,732 | 7/1995 | Lee et al. . |
| 5,448,621 | 9/1995 | Kradesa . |
| 5,452,290 | 9/1995 | Miham, Jr. . |
| 5,461,627 | 10/1995 | Rypinski . |
| 5,481,561 | 1/1996 | Fang . |
| 5,490,087 | 2/1996 | Redden et al. . |
| 5,537,406 | 7/1996 | Bringer . |
| 5,555,444 | 9/1996 | Diekelman et al. . |
| 5,574,969 | 11/1996 | Olds et al. ............................ 455/12.1 |
| 5,592,470 | 1/1997 | Rudrapetma et al. . |
| 5,594,729 | 1/1997 | Kanelia et al. . |
| 5,594,940 | 1/1997 | Peterson et al. . |
| 5,784,616 | 7/1998 | Horvitz .................................. 395/672 |
| 5,812,545 | 9/1998 | Liebowitz et al. ...................... 370/337 |
| 5,826,189 | 10/1998 | Thapa et al. . |

OTHER PUBLICATIONS

Ogasawara et al., "Decision–Theoretic Allocation Satellite Communications Resources," Oct. 22, 1996, MICOM 96, vol. 1, pp. 250–254.

(List continued on next page.)

*Primary Examiner*—Reinhard J. Eisenzopf
*Assistant Examiner*—Greta J. Fuller
*Attorney, Agent, or Firm*—Swidler Berlin Shereff Friedman, LLP

[57] ABSTRACT

A communications system allocates communication bandwidth to calls in such a manner for optimizing network system performance. The system uses knowledge about the state of the past and present network demand, and network resources. Predictions of future demand and future network resources are used to calculate future network performance. Allocation decisions are chosen based on network performance calculations and probabilities of achieving future network states.

31 Claims, 4 Drawing Sheets

OTHER PUBLICATIONS

Ogasawara et al., "Experiments With Tactical Network Simulation, Routing and Management," Oct. 23, 1996, MICOM, vol. 2, pp. 501–505.

Biagini et al., "Efficient Use of SATCOM Resources in MSE Networks," 1993, MICOM '93, vol. 3, pp. 768–773.

Kim et al., "An Efficient Algorithm For Generalized SS/TDMA Scheduling With Satellite Cluster and Intersatellite Links,"International Journal Of Satellite Communications, vol. 12, 31–37, 1995, pp. 31–37.

Kota, "Demand Assignment Multiple Access (DAMA) Techniques For Satellite Communications", National Telecommunications Conference, 1981, vol. 2, C8. 5.1–5.7.

DECISION-THEORETIC SATELLITE COMMUNICATIONS SYSTEMS

This is a continuation of U.S. patent application Ser. No. 08/953,424, filed Oct. 17, 1997.

BACKGROUND OF THE INVENTION

1. Field of the Invention

The present invention relates to the field of telecommunications. More particularly, the present invention relates to a system and a method for allocating communication system resources to calls for optimizing network system performance.

2. Description of Related Art

In a typical satellite communications system, caller communication units are linked to ground-based communication facilities, or ground nodes, which, in turn, are linked to satellites. In some cases, individual communication units are linked directly to a satellite. The amount of caller traffic in a communications system is limited by the available communication bandwidth of the system. When caller demand exceeds the capacity of the system, new callers are denied access.

In conventional communication systems, there is a fixed amount of satellite bandwidth assigned to each ground node. The available bandwidth in these systems is often used inefficiently. For example, one ground node may be overloaded with calls, denying access to new callers, whereas a neighboring ground node may be underutilized, leaving unused satellite bandwidth assigned to that ground node. When a ground station becomes overloaded with calls, there is no mechanism in a conventional satellite system for transferring satellite bandwidth from an underutilized ground station.

To overcome this deficiency, demand-assigned multiple access (DAMA) systems utilize a central control station that allocates satellite bandwidth on a call-by-call basis. Such conventional systems employ a simple, greedy strategy for assigning satellite bandwidth. That is, a ground node requests additional bandwidth from the central control station when a new call is received. The central control station assigns satellite bandwidth to the ground nodes as bandwidth requests are received allowing bandwidth to be reassigned from an underutilized ground node to an overloaded one.

Instead of using a greedy approach, a few conventional satellite systems use a predictive approach, whereby the central control station predicts which stations will be receiving a high call demand, and allocates extra bandwidth to those stations in anticipation of their future need.

Nevertheless, conventional greedy DAMA systems and predictive DAMA systems do not always allocate resources in an optimal manner. For example, in a system in which calls have different priority levels, if available bandwidth is allocated for handling a high demand of low priority calls, future higher priority calls may be blocked, or calls in progress may require preempting for satisfying demands of higher priority calls. As another example, if the system allocates all available bandwidth to one ground node for handling a high call demand or a high predicted call demand, there might be a lack of bandwidth available for another ground node that will receive high call demand in the future.

What is needed is a system that measures trade-offs involved in allocating bandwidth between stations over time. Further, what is needed is a system that determines an optimal allocation of communication resources (i.e., bandwidth) that maximizes overall network system performance.

SUMMARY OF THE INVENTION

The present invention provides a communications system that measures trade-offs involved in allocating bandwidth between stations over time. The present invention further provides a communications system that determines an optimal allocation of communication resources (i.e., bandwidth) maximizing overall network system performance.

The advantages of the present invention are provided by a system that includes ground nodes receiving calls and a control unit allocating communication resources to received calls by maximizing a communication system expected utility function. The control unit allocates communication system resources, such as communication bandwidth, by assigning unused communication resources to calls, blocking calls, or preempting calls in progress.

The control unit maximizes the expected utility function of the communication system by identifying decisions relating to communication resource allocation, each decision $d_i$ being a different communication resource allocation decision. The control unit determines a maximum expected utility E as:

$$E[u(di,C)] = \sum_{sj \in S} u(sj,di) p(sj|di,C)$$

wherein $s_j$ is a possible configuration of communication bandwidth assigned to individual calls, C is a system context based on the past and/or present network state, $p(s_j|d_i,C)$ represents a probability of achieving state $s_j$ given a decision $d_i$ and the system context C, and $u(s_j,d_i)$ represents a utility function based on a weighted combination of network performance characteristics. The control unit selects the optimal system resource allocation decision $d_i$, by choosing the decision that maximizes the expected utility E of the communication system.

The communication resources that are allocated are time slots, frequency channels, or a combination of time slots and frequency channels. The control unit includes a memory that stores information representing past caller demand and network supply (i.e., network resource availability) information. The past caller demand information can include ground node caller demand, call holding times, call source and destination ground nodes, data rate requirements, error rate requirements, and call priority levels. The network supply information can include network connectivity, call delay times, satellite link reliability, ground node reliability, battery capacity of individual satellites, and relative location of individual satellites.

The utility function $u(s_j,d_i)$ is a weighted combination of network performance characteristics which can include grade of service (percentage of blocked calls), throughput, message delay, utilization, number of satellite hops, percentage of calls preempted, quality of service, and satisfaction of higher priority call requests. The utility function $u(s_j,d_i)$ can also be a summation of a past utility function, a present utility function, and a future utility function. Calls can have an associated priority level and can be either voice or data.

The control unit can allocate an optimal communication resource configuration for each call request, or the control unit can allocate an optimal communication resource configuration after a predetermined number of call requests are received, or periodically after a predetermined time period has elapsed. Each call individual call can be divided into multiple packets. The control unit can make a resource allocation decision for the entire call, or for each individual packet.

BRIEF DESCRIPTION OF THE DRAWINGS

The present invention is illustrated by way of example and not limitation in the accompanying figures in which like reference numerals indicate similar elements and in which.

DETAILED DESCRIPTION

The present invention provides a Decision-Theoretic DAMA (DT-DAMA) technique that intelligently allocates bandwidth requests, call blocks, and call preemptions based on a current network state and predictions of a future network state to maximizes overall network system performance. The DT-DAMA approach uses Bayesian decision theory to intelligently allocate communication resources to call requests. The system decides to either assign bandwidth to calls, block calls, or preempt calls in progress to maximize overall network system performance. Bayesian decision theory combines probabilistic reasoning (predicting future bandwidth supplies and caller demands) with utility reasoning (measuring network performance characteristics according to predetermined system preferences).

Compared to neural networks or rule-based systems, Bayesian decision theory provides both accurate modeling of complex systems and efficient run-time execution. Simple optimization functions like those often used by neural networks are often unable to explicitly model complex problems, and because of the lack of system initialization data, the neural networks usually require extensive tuning and training to converge to an acceptable solution. Rule-based systems which encode general directives like: "If a request has routine priority AND there is available bandwidth, THEN grant the request" are inadequate for complex and uncertain systems, where it becomes difficult to create and maintain an acceptable set of rules.

Figure 1:
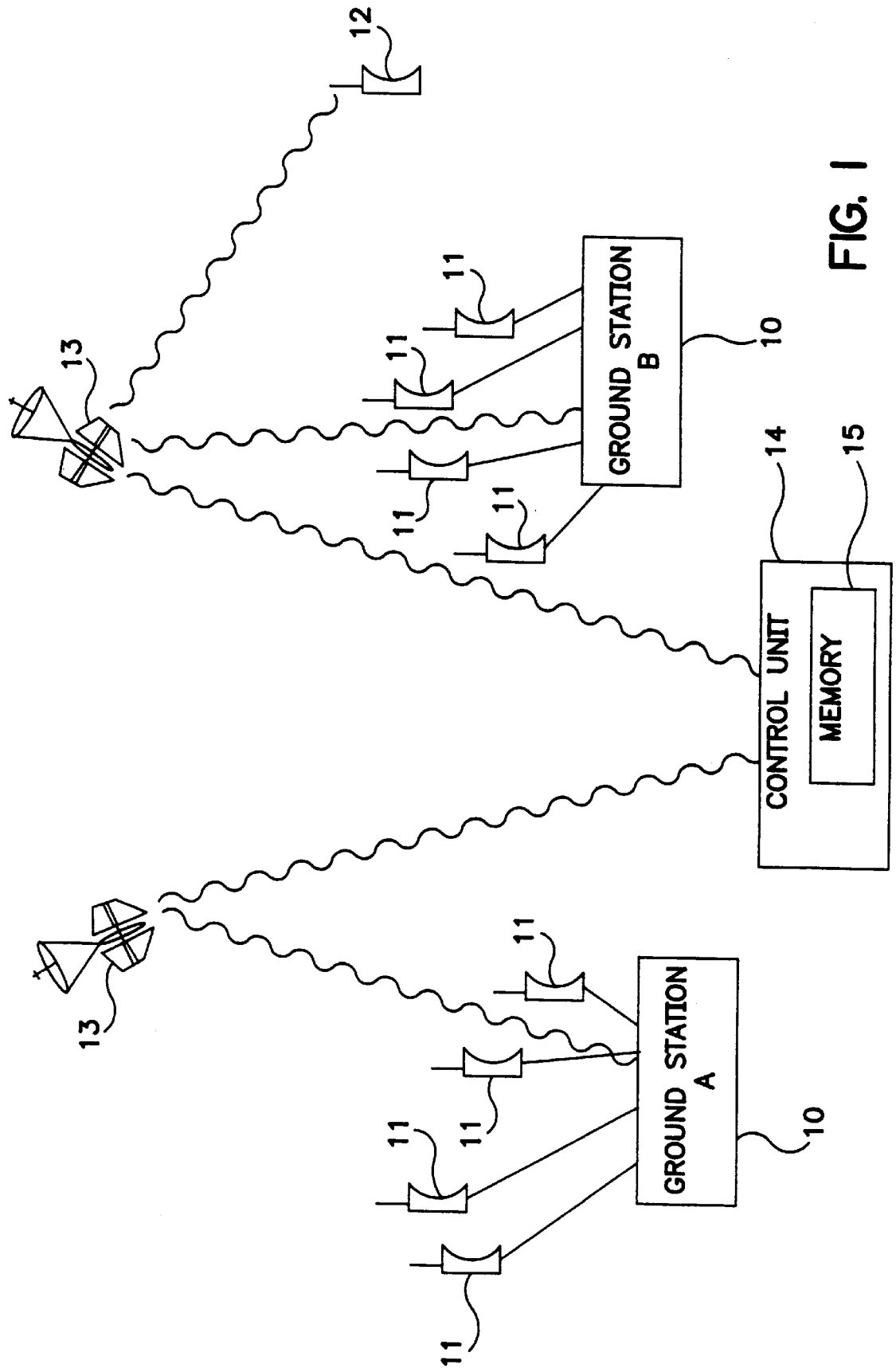
FIG. 1 illustrates a satellite-based communications system.

FIG. 1 shows an exemplary satellite communications system that utilizes the present invention. The exemplary system of FIG. 3 includes a plurality of individual communication units 11 and 12, a plurality of ground stations 10, a plurality of satellites 13 and a control unit 14 with a memory 15. Individual communication units 11 are linked in a well-known manner to a ground station 10 which, in turn, is linked in a well-known manner to at least one satellite 13. Individual communication units 12 can link directly to the satellite 13. A control unit 14 makes decisions for allocating communication resources to calls, such as communication bandwidth, so that network system performance is optimized. Control unit 14 also contains a memory 15 that stores past caller and network resource history information. Control unit 14 may be located in a separate ground facility, as shown in FIG. 1, but may also be located inside one of the ground stations 10, in a satellite 13, or distributed in a well-known manger among multiple ground stations and satellites.

Figure 2:
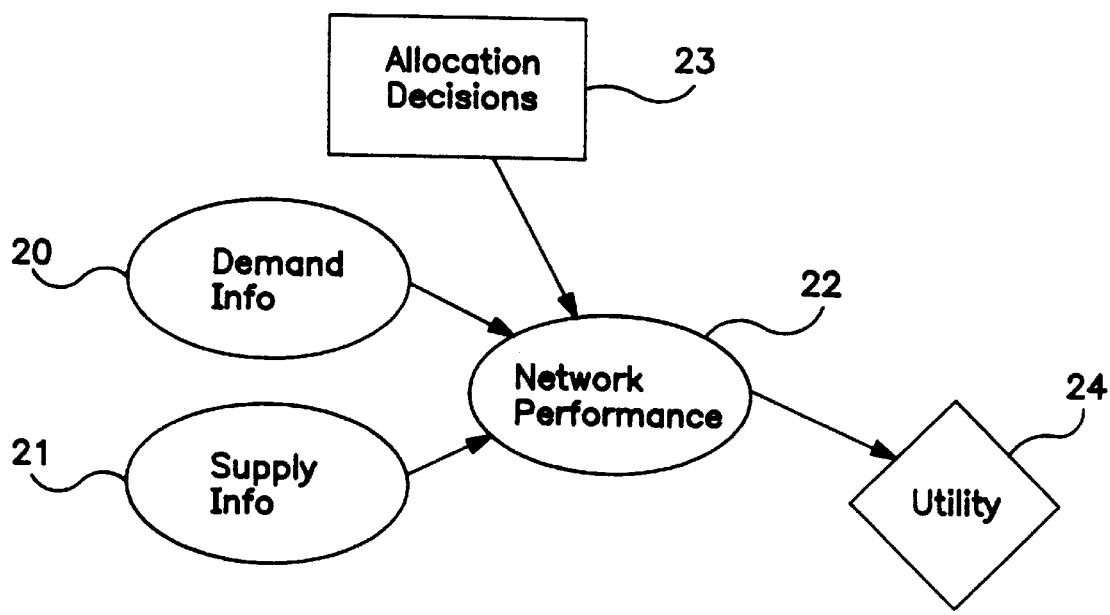
FIG. 2 is a diagram showing influences affecting a decision problem for allocating communication system resources.

FIG. 2 is a diagram showing the communication network resource communication network resource allocation decision problem as an influence diagram. In an influence diagram, ovals represent uncertain variables, rectangles represent decisions, and diamonds represent utility variables. Arrows pointing to ovals represent conditional probabilistic dependence. Arrows pointing to diamonds represent conditional utility dependence. The lack of an arrow implies conditional independence.

The details of network demand information 20, network supply information 21 (i.e., network resource availability), and network performance 22 variables are abstracted into the three respective uncertain variables. The utility 24 of the decision problem is directly dependent only on the network performance characteristics. Allocation decisions rectangle 23 represents decisions to be optimized, that is, allocations of satellite bandwidth over a duration of the analysis period.

Figure 3:
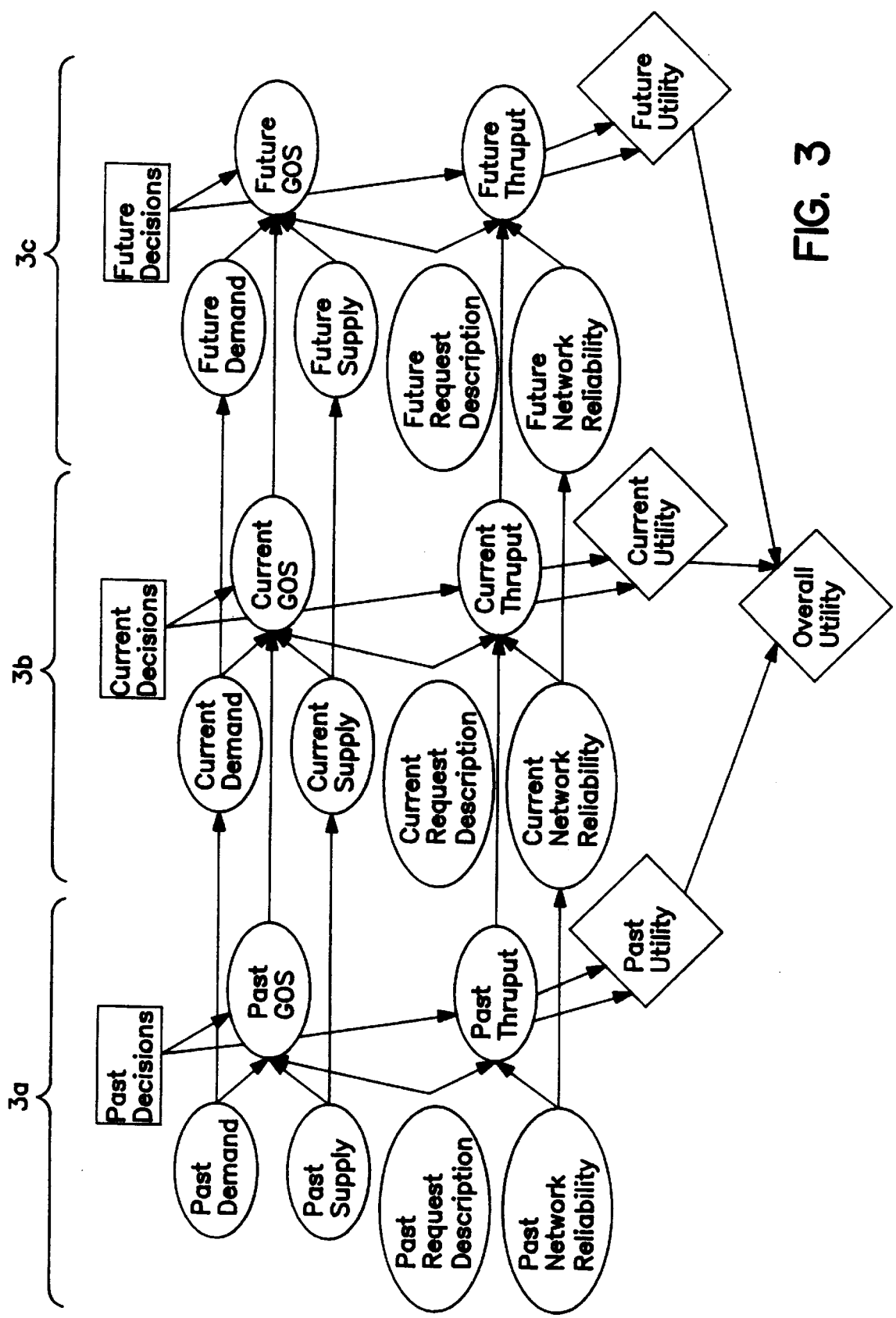
FIG. 3 shows details of an influence diagram relating past, present, and future network states for allocating communication system resources according to the present invention.

FIG. 3 provides a more detailed model of the same decision problem for satellite communications resource allocation. In this influence diagram, the model has been temporally divided into past 3a, current 3b, and future 3c states. For simplicity, only two network performance variables are shown: grade-of-service (GOS) and throughput. The expected utility of a network state is a function of the network performance variables with arrows pointing into the diamond utility nodes. In the example shown, the utility functions are maximized when throughput and GOS are maximized. The final utility node is also a weighted function of the sub-utilities at each time point in the past, present, and future.

Information that is available is entered as evidence by setting the values of the nodes in the influence diagram. For example, the information for the past nodes 3a is generally known, and their values can be input into the corresponding node. Then, through inference (i.e., application of probability and utility axioms), updated probability distributions on the other nodes are determined. Let $V=\{v_1,\ldots,V_n\}$ represent the n uncertain variables in the future nodes (future demand, future supply). Let $pa(v_i)$ be defined as the set of parents of $v_i$, that is, the past and current nodes with arrows pointing into $v_i$. The probability of achieving a certain future network state is then calculated by:

$$P(v_1,\ldots,v_n)=\prod_{1\leq i\leq n}P(v_i|pa(v_i)) \qquad (5)$$

This process is repeated for each individual decision that is evaluated. The decision leading to the highest expected utility is the optimal choice.

Figure 4:
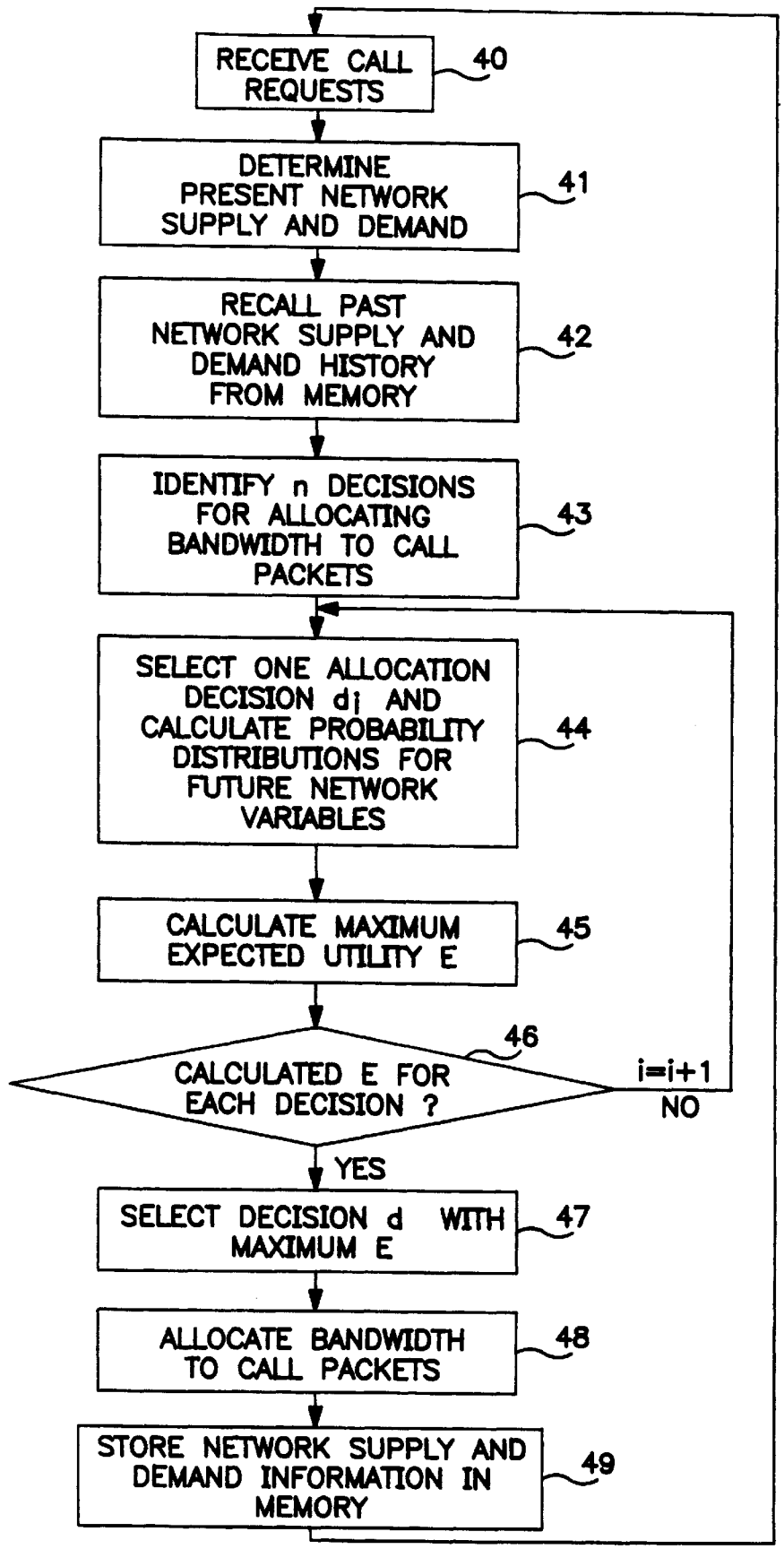
FIG. 4 is a flow chart of the basic steps used by the system of FIG. 1 to allocate communication resources to call requests.

FIG. 4 is a flow chart depicting how control unit 14 allocates bandwidth to calls so that system performance is optimized. As calls are placed by communication units 11 and 12, control unit 14 receives requests for bandwidth for the calls, at step 40. Control unit 14 can allocate communication bandwidth as each individual call is received, after a predetermined number of calls is received, or periodically after a predetermined time period as elapsed.

At step 41, control unit 14 determines present network demand and network supply (i.e., network resource availability) information. At step 42, the control unit 14 retrieves past network demand and supply history information from memory 15. Examples of variables that represent caller demand information used by the present invention include: (1) call frequency for each ground node, (2) call holding times, (3) source and destination nodes for each call, (4) call priority levels, and (5) data and error rate requirements. Examples of network supply variables that can be used by the present invention include: (1) network connectivity, (2) call delay times, (3) satellite link reliabilities, (4) ground link reliabilities, (5) ground node reliabilities, (6) satellite locations, and (7) satellite battery capacities.

After receiving call requests and past and present network information, at step 42, control unit 14 determines n possible decisions for allocating system bandwidth to the call requests received in step 40. Control unit 14 determines which allocation decisions are possible by evaluating present network supply and demand information. Each individual decision $d_i \in D$ may consist of assigning unused bandwidth to calls, blocking calls, or preempting existing calls. Each decision results in a different configuration of assigning time slots and/or frequency channels to call requests. Calls can be broken up into packets, and the control unit 14 can make a resource allocation decision for each individual packet or for the entire call. Assigning communication bandwidth on the packet level frequently produces better performance due to the smaller granularity of the unit processed.

In step 44, control unit 14 selects one allocation decision $d_i$ for allocating bandwidth to calls (or call packets), and based on the selected decision, calculates probability distributions for future network supply and demand variables. For example, the control unit 14 calculates probability distributions for future overall caller demand, high-priority call demand, link reliability, etc. The control unit 14 calculates probability distributions based on the particular allocation decision $d_i$ and past and present network supply and demand information, as shown by steps 41 and 42.

Once the probability distributions for future network supply and demand variables are calculated, control unit 14 measures overall network system performance based on the selected allocation decision $d_i$. Network system performance is measured by calculating a utility function that is a weighted combination of various network performance characteristics. The network performance characteristics, are functions of the network supply and demand information. Utility represents system preferences for achieving different network performance criteria. Examples of network performance characteristics: (1) grade of service (percentage of calls that fail to connect on the first attempt), (2) throughput, (3) message delay, (4) network utilization, (5) number of satellite hops, (6) percentage of calls preempted, (7) quality of service, and (8) satisfaction of higher priority calls.

A utility function can be a summation of a past utility function, a present utility function, and a future utility function. The past utility function measures past network performance. Similarly, present utility function measures present network performance, while the future utility function measures future network performance. One example of a utility function that can be used by the present invention is a linear weighted summation of network performance characteristics, such as:

U=A1 (Grade of Service)+A2 (Throughput)+A3 (Message Delay) +A4 (Utilization)+A5 (Quality of Service)+A6 (Number of Satellite Hops)+A7 (Percentage of Calls Preempted)+A8 (Quality of Service)     (1)

In the example utility function of Equation (1), if throughput is more highly valued than grade of service, then coefficient $A_2$ would be greater than coefficient $A_1$ by the degree necessary to obtain satisfactory throughput in accordance with the relative valuing.

The future utility function is more difficult to calculate than the past and present utility functions because the future network supply and demand information is not known. Future network performance is measured by the use of an expected utility function. The expected utility function combines the probability distributions of future network supply and demand variables calculated in step 44, and the network performance criteria. An expected utility function is calculated using:

$$E[u(di,C)] = \sum_{sj \in S} u(sj,di) p(sj|di,C) \quad (2)$$

The function $p(s_j|d_i,C)$ represents the probability of achieving a future network state $s_j$ given allocation decision $d_i$ selected in step 44 and a system context C. System context C includes the past and present network demand and supply information. Each individual outcome state $s_j \in S$ represents a possible allocation of communication bandwidth time slots or frequency channels to individual calls (or packets). The probability of achieving each network outcome state $s_j$ is calculated based on the probability distributions of future network supply and demand information calculated in step 44. The function u(sj, di) represents the utility of state $s_j$ after decision $d_i$ has been made.

As a simple example of how the expected utility function operates, consider a system where the only network performance criteria of interest is throughput. Suppose control unit 14 determines three outcome states: high throughput, medium throughput, and low throughput. Based on making a particular allocation decision $d_i$ and the predictions of future network supplies and demands, control unit 14 calculates $P_{high}$, $P_{med}$, and $P_{low}$, the probabilities of achieving a high, medium, and low throughput, respectively. Control unit 14 also calculates $u_{high}$, $u_{med}$, and $u_{low}$, the utility or "value" that the system attaches to achieving high, medium, and low throughputs, respectively. The expected utility of making decision $d_i$ is then:

$$E(d_i) = p_{high} u_{high} + p_{med} u_{med} + p_{low} u_{low} \quad (3)$$

After the expected utility E has been calculated for the first decision $d_1$, then control unit 14 returns to repeat steps 44 and 45 for each of the n allocation decisions. In step 47, the system then selects the decision d* where:

$$d^* = \operatorname{argmax}_{d_i \in D} E[u(d_i,C)] \quad (4)$$

Decision d* represents the decision which produces the maximum expected utility E. This is the allocation decision that produces the optimal network performance. At step 48, control unit 14 then allocates bandwidth to the calls (or call packets), as determined by decision d*. Lastly, at step 49, control unit 14 stores the present network supply and demand information in memory 15, to be retrieved in future cycles for calculating updated probability distributions.

The expected utility E is large for decisions that result in high probabilities of achieving high-performance network states. As a simple example of overall system operation: if there is a relatively low probability for ground station A (FIG. 1) to have a high caller demand during the next hour, then the control unit 14 is not likely to assign additional bandwidth to ground station A, because a decision to assign additional bandwidth to ground station A results in a low expected utility E. However, if ground station A is predicted to have a small amount of high priority calls during the next hour, control unit 14 may decide to assign additional bandwidth to ground node A when the utility function places enough value on satisfying high priority calls. If the utility function places more value on overall system throughput, rather than satisfying priority calls, then control unit 14 will not likely assign additional satellite bandwidth to ground station A. In summary, whether ground station A is allocated bandwidth depends both on the probability that A will receive a high caller demand, and the value that the system places on satisfying that demand.

What is claimed is:

1. A communications system, comprising:

a ground node receiving calls; and a control unit maximizing a communication system expected utility function and allocating communication resources to received calls based on the communication system expected utility function, the control unit including;

means for identifying a plurality of possible communication resource allocation decisions for each call; and means for determining an optimal communication resource allocation by maximizing an expected utility function of the communication system to select one of said decisions, including;

means for determining the probability of achieving a given communication system performance state based on an identified decision and a communication system context, the communications system context based on at least one of a present network state and a past network state; and means for determining the utility of achieving said given communication system performance state based on said identified decision.

2. The system according to claim 1, wherein, preferably, the control unit allocates communication system resources by performing at least one of:

assigning unused communication resources to calls, the communication resources including communication bandwidth;

blocking calls; and preempting calls in progress.

3. The system according to claim 2, wherein the control unit maximizes the expected utility function of the communication system by:

identifying decisions relating to communication resource allocation, each decision di being a different communication resource allocation decision;

determining a maximum expected utility E as:

$$E[u(i,C)] = \sum_{s_j \in S} \Sigma u(sj,di) p(sj|di,C)$$

wherein $s_j$ is a possible configuration of communication bandwidth assigned to individual calls;

wherein C is a system context based on at least one of a present network state and a past network state:

wherein $p(s_j|d_i,C)$ represents a probability of achieving state $s_j$ given a decision $d_i$ and the system context C;

wherein $u(s_j,d_i)$ represents a utility function based on a weighted combination of network performance characteristics; and selecting the resource allocation decision di that maximizes the expected utility E of the communication system.

4. The system according to claim 3, wherein the communication resources that are allocated are one of time slots, frequency channels, and a combination of time slots and frequency channels.

5. The system according to claim 4, wherein the control unit includes a memory storing information representing past caller demand and network resource information.

6. The system according to claim 5, wherein the past caller demand information includes at least one of caller demand of individual ground stations, call holding times, locations of source and destination ground nodes of individual calls, data rate requirements, error rate requirements, and priority levels of individual calls.

7. The system according to claim 6, wherein the network resource information includes at least one of network connectivity, call delay times, satellite link reliability, ground node reliability, battery capacity of individual satellites, and relative location of individual satellites.

8. The system according to claim 7, wherein the utility function $u(s_j,d_i)$ is a weighted combination of at least one of grade of service, percentage of blocked calls, throughput, message delay, utilization, number of satellite hops, percentage of calls preempted, quality of service, and satisfaction of higher priority call requests.

9. The system according to claim 8, wherein the utility function $u(s_j,d_i)$ is further a summation of at least one of: a past utility function, a present utility function, and a future utility function.

10. The system according to claim 9, wherein each call has an associated priority level.

11. The system according to claim 10, wherein each call is one of a voice call and a data call.

12. The system according to claim 11, wherein the control unit allocates an optimal communication resource configuration for each call request.

13. The system according to claim 11, wherein the control unit allocates an optimal communication resource configuration after a predetermined number of call requests are received, by determining the maximum expected utility E of resource allocation decisions for the predetermined number of calls.

14. The system according to claim 11, wherein the control unit allocates an optimal communication resource configuration periodically, with a predetermined time period, by determining the maximum expected utility E of resource allocation decisions of at least one call in that time period.

15. The system according to claim 11, wherein each individual call is divided into multiple packets.

16. The system according to claim 12, wherein each packet is assigned a different communication resource allocation.

17. A method for allocating communication resources, the method comprising the steps of:

receiving call requests from a plurality of communication units;

identifying a plurality of possible communication resource allocation decisions for each call request, each communication resource allocation decision including a communication bandwidth; and determining an optimal communication resource allocation by maximizing an expected utility function of the communications system to select one of said decisions, including the steps of;

determining the probability of achieving a given communication system performance state based on an identified decision and a communication system context, the communications system context based on at least one of a present network state and a past network state; and determining the utility of achieving said given communication system performance state based on said identified decision.

18. The method according to claim 17, wherein the step identifying possible communication resource configurations to each call request, includes at least one of assigning unused communication bandwidth, blocking calls, and preempting calls in progress.

19. The method according to claim 18, wherein the step of determining the optimal communication resource configuration includes the step of maximizing the following expected utility equation:

$$E[u(di,C)]_{sj \in S} = \Sigma u(Sj,di)p(Sj|di,C)$$

wherein $s_j$ is a possible configuration of communication bandwidth assigned to individual calls;

wherein C is a system context of at least one of a present network state and a past network state;

wherein $p(s_j|d_i,C)$ represents a probability of achieving state $s_j$ given a decision $d_i$ and the system context C; and wherein $u(s_j,d_i)$ represents a utility function based on a weighted combination of network performance characteristics.

20. The method according to claim 19, wherein the communication bandwidth includes at least one of time slots and frequency channels.

21. The method according to claim 20, further including a step of storing past and present caller demand and network resource information.

22. The method according to claim 21, wherein the past and present caller demand information includes at least one of: caller demand of individual ground stations, call holding times, locations of source and destination ground nodes of individual calls, data rate requirements, error rate requirements, and priority levels of individual calls.

23. The method according to claim 22, wherein the network resource information includes at least one of: network connectivity, call delay time, satellite link reliability, ground node reliability, battery capacity of individual satellites, and relative location of individual satellites.

24. The method according to claim 23, wherein the utility function $u(s_j|d_i)$ includes at least one of: grade of service, percentage of blocked calls, throughput, message delay, utilization, number of satellite hops, percentage of calls preempted, quality of service, and satisfaction of higher priority call requests.

25. A method according to claim 24, wherein each incoming call has an associated priority level.

26. The method according to claim 25, wherein each call is one of a voice call and a data call.

27. The method according to claim 26, wherein the control unit allocates an optimal communication resource configuration for each call request.

28. The method according to claim 26, wherein the control unit allocates an optimal communication resource configuration after a predetermined number of call requests are received, by determining the maximum expected utility E of multiple sequential resource allocation decisions.

29. The method to claim 26, wherein the control unit allocates an optimal communication resource configuration periodically, with a predetermined time period, by determining the maximum expected utility E of resource allocation decisions of at least one call in that time period.

30. The method according to claim 26, wherein each individual call is divided into multiple packets.

31. The method according to claim 29, wherein each packet is assigned a different communication resource allocation.

* * * * *